United States Patent [19] [11] 4,385,287
Eatwell [45] May 24, 1983

[54] MULTIPLE ALARM CONDITION DETECTION AND SIGNALLING

[75] Inventor: Edgar G. Eatwell, East Barnet, England

[73] Assignee: Securicor Granley Systems Limited, England

[21] Appl. No.: 212,167

[22] Filed: Dec. 2, 1980

[30] Foreign Application Priority Data

Dec. 7, 1979 [GB] United Kingdom ................ 7942387

[51] Int. Cl.[3] .......................... G08B 1/08; H04Q 1/30
[52] U.S. Cl. .................................. 340/537; 340/505; 340/538; 340/825.06; 340/825.43
[58] Field of Search ................ 340/537, 521, 506–513, 340/531, 536, 538, 505, 660–664, 164 R, 310 R, 825.06, 825.07, 825.08, 825.09, 825.1, 825.36, 825.37, 825.39, 825.42, 825.43, 825.54, 825.63, 825.64

[56] References Cited

U.S. PATENT DOCUMENTS

| | | | |
|---|---|---|---|
| 3,603,949 | 9/1971 | Walthard | 340/511 |
| 3,665,461 | 5/1972 | Gnagi et al. | 340/512 |
| 3,676,877 | 7/1972 | Kobayashi | 340/524 |
| 3,702,474 | 11/1972 | Fink et al. | 340/537 |
| 3,716,834 | 2/1973 | Adams | 340/506 |
| 3,797,008 | 3/1974 | Yuasa | 340/511 |
| 3,991,413 | 11/1976 | Berger | 340/537 |
| 4,268,822 | 5/1981 | Olsen | 340/505 |

FOREIGN PATENT DOCUMENTS

| | | | |
|---|---|---|---|
| 913666 | 12/1962 | United Kingdom | 340/537 |
| 1002291 | 8/1965 | United Kingdom | 340/537 |

*Primary Examiner*—John W. Caldwell, Sr.
*Assistant Examiner*—Donnie Lee Crosland
*Attorney, Agent, or Firm*—Lewis H. Eslinger

[57] ABSTRACT

A security system has a locality station sensing security risks such as fires, electrical faults and break-ins, being powered by a single line from a central station. The loading on the power supply is determined by logic circuits to give direct remote indications of the security state at the locality station. The power supply is a square wave which is altered in waveform to give alternative commands to the locality station, e.g. to sound a warning or to operate a fire sprinkler, while continuing to supply power. To enable maximum use of the single line and single square wave, the latter is treated as two separate signals in that loading by the locality station is selective as regards the polarities. Similarly the alternative commands available are doubled by using separate control of the durations of the positive and negative square wave portions, while continuing to supply power.

19 Claims, 7 Drawing Figures

MULTIPLE ALARM CONDITION DETECTION AND SIGNALLING

The present invention relates to an alarm system for signalling a plurality of alarm conditions without using an undue amount of cabling or other equipment.

BACKGROUND OF THE INVENTION

It is known to use diodes in parallel with on-off security switches, ac excitation of the system and separate reading of the effects of the positive and negative wave portions of ac excitation. These two portions give different effects, since the diodes are each low impedance devices only for one of the two exciting wave portions. Such a system is known from British Pat. No. 913,666 with contacts shunted by diodes. Some of the diodes check connections to circuit security switches with one polarity of the ac wave and the other diodes read for an alarm condition using the alternate polarity portions. This prior proposal provides some economies in resources such as cables.

It is known also to use plural voltage references such as zener diodes of different value to signal different alarm locations selectively, which can also save components in alarm systems generally. Eg see U.S. Pat. No. 3,676,877 (Kobayashi). This patent discloses shunt paths across a common line, of which each path has an on-off device responsive to a respective fire-sensor and in series with a zener device. The zeners have different values, so that a dc reading signal develops a voltage across the common line of a value which is indicative of which sensor has been activated. One cable input can thus serve many paths.

The use of end-of-cable or terminating zeners to indicate damage in a cable feeding a security network is known e.g. from U.K. Pat. No. 1,002,291 or U.S. Pat. No. 3,797,008 (Yuasa). U.K. No. 1,002,291 indeed gives different voltage indications by means of a series resistor and a voltage indicator at the input end, for open-circuit, short-circuit, normal and fire or abnormality alarm conditions, by means of shunt paths each having an on-off alarm contact and zener. Again, one voltmeter and cable can distinguish many alarm states.

SUMMARY OF THE INVENTION

A preferred embodiment of the present invention not only measures the effects of such a network of on-off security switches, diodes and voltage references to signal the conditions of groups of the switches, e.g. by locality or status, but also checks intervening wiring for open and short circuits, and uses the reading ac wave firstly to power further types of alarm sensor, which may be fire sensors or smoke detectors, and secondly to manifest an alarm condition (e.g. to an intruder or to local security personnel), the ac wave continuing to be operative for reading purposes. The intruder or the fire sensor may operate on on-off devices of the network. Others may be operable manually and selectively, as "call points".

An important feature of the present invention is thus means for independently processing two different portions of a wave so that the wave can carry at least two distinguishable informations on different alarm states.

Another important feature of the present invention is thus means for independently processing two different portions of a wave, so that the wave can carry either of at least two distinguishable alarm commanding signals in response to different alarm states, eg. initiating sirens or fire sprinklers.

The two different wave portions presently preferred are the negative and positive portions of an ac wave eg a square alternating wave sent over a plurality of cables to respective localities to be protected from a central station, there being required only one cable to each location. Each cable is usable both for carrying any of said alarm state information signals in one direction and for carrying any of said alarm alarm initiating signals in the opposite direction. Therefore each locality needs only one cable path to link the locality to a common central station.

The alarm state information may be denoted by the voltages of the two wave polarity portions as measured at the central station on the wave sent from the central station, and the alarm initiating signals may be denoted by durations of the two polarity portions of the wave sent from the central station.

Thus by an optional refinement, the durations of the positive and negative half cycles of the reading wave powering an equipment at a locality may be altered independently at a central station sending the reading wave. By this alteration, information obtained from the positive and negative voltages of the reading wave is used to manifest the correct alarm at the locality, over the same wave by selecting half-wave durations, and therefore over the same cable path. A great economy is available because the two different ways (ie time and voltage level) of alternating the two polarities on the same wave, enable four groups of informations to be carried over one cable pair, two groups in each direction.

Communication systems embodying the instant invention comprise a central station arranged to transmit an ac wave over a cable to a locality station, to sense voltages developed at each polarity in the ac wave as locality reading information, and to vary the durations of the individual polarities in the transmitted ac wave as command informations based on the incoming locality reading informations. The locality station will have polarity-conscious cable loading means responsive to information sensors and polarity-conscious wave reading means arranged to execute commands according to polarity durations in the ac wave from the cable. The information will be security or alarm condition information in preferred embodiments.

Preferred embodiments feature ac line energization, a series measuring impedence, voltage comparisons or determinations for both polarities at the input end; and either (I) a plurality of series on-off contacts bridged by diodes and back-to-back termination voltage reference or zener diode pairs; or (II) a plurality of shunt on-off contacts each in series with a zener, some zeners being oppositely directed to others, preferably diodes also in series blocking forward currents to the zeners; or both (I) and (II).

Summarizing the majority of the preferred embodiments, there is provided a method of feeding an ac wave to a security system on a single cable, (1) wherein each polarity of the ac is separately utilized to read a distinct alarm condition, by means of a nonlinear device in the system, and (2) to sound a respective alarm, or otherwise specifically react to the particular alarm condition read, using the same cable for all these. The same cable and ac wave are used to form the necessary dc supply to smoke detectors etc of the localities to be read for the above alarm conditions.

BRIEF DESCRIPTION OF THE DRAWINGS

This embodiment, and alternative details and refinements will now be described in conjunction with the drawings, in which.

DETAILED DESCRIPTION OF EMBODIMENTS

Figure 1:
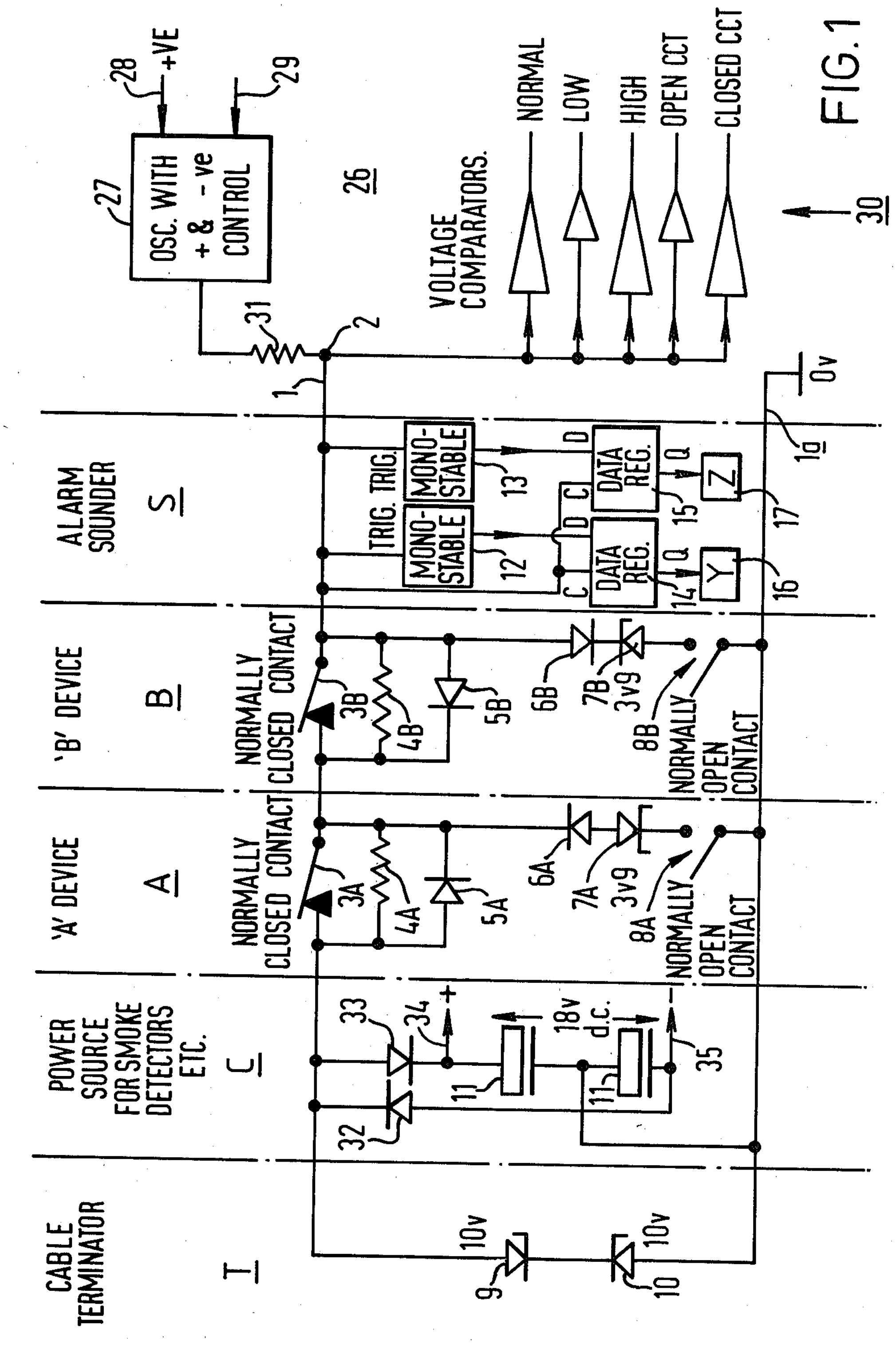
FIG. 1 shows an embodiment, partly in block schematic form.

Referring to FIG. 1, a transmission cable shown diagrammatically having twin conductors 1, 1*a* extends leftward from a measuring point 2 at a control station generally to the right of point 2 in FIG. 1. Cable 1 extends to an alarm network including, in optional order apart from the cable terminating section T at the end of the line; output alarm sounder devices at a section S of greater or less urgency or otherwise different significances; a first group of devices at a section A; a second group of devices at a section B and smoke or other detecting devices at a section C that need a steady dc bias. The terminating section T and the A and B sections thus constitute multiple shunt paths across the cable conductors. Sections A and B also include series devices.

It would be desirable that short circuits, open circuits, operations of any A device, and operation of any B device be distinctively signalled to the control station, using only one reading energizing signal and using only one signalling/energizing cable. Furthermore it would be helpful if shunt or series portions of the A and B devices could each be distinguished. Moreover, it is desirable that responsive to an alarm condition, an alarm signal could then be distributed using the same condition-reading signal on the same cable, leading to substantial economy.

The A sections each contain a normally closed on-off contact 3A, a resistor 4A and a diode 5A in a parallel combination which is in the path of cable conductor 1. Each A section also contains a diode 6A, a zener 7A and a normally open on-off contact 8A in a series combination, which is in shunt across cable conductors 1 and 1*a* upstream of the parallel combination.

The B sections resemble the A sections but have oppositely directed diodes and zeners. Each B section contains a normal closed contact 3B, a resistor 4B and a diode 5B in a parallel combination which is in the path of cable conductor 1. The B sections also each have a diode 6B, a zener 7B and a normally open on-off contact 8B in a series combination, which shunts cable 1 to cable 1*a* before its series on-off contact 3B.

It is envisaged that the normally closed series on-off contacts 3A in the A sections may open in response to fire on smoke sensors in the sections C, e.g. using fusible wire or bimetallic strips (neither shown). The normally open on-off contacts 8A in the sections A may be closed by intruders stepping on hidden trigger switches or breaking photo-detector beams (neither shown), or opening doors or windows. The corresponding contacts in the sections B may be manually operated, e.g. as "call-points" when fire or intruders are detected by night-watch men or other security personnel. Exactly how the on-off devices are deployed to respond to what situations is a matter of choice for the user of this embodiment. The invention teaches the economical reading of the states of the devices and the distribution of alarm-raising signals, using one twin-cable and preferably using one signal with controllable parameters.

The termination section T shunts two matching oppositely directed zeners 9, 10, each of medium voltage value illustrated as 10 volts in series across lines 1 and 1*a*. The sections C develop dc from a line ac for smoke detectors 11 or other sensors which may require dc.

The alarm-raising sections S are described below in more detail, but contain timing monostables 12, 13 with delayed responses to opposite poles of the ac line waveform so that respective data registers 14, 15 can indicate abnormally short occurrences of a respected one of the two polarity portions to activate respective alarm warnings, e.g. local sounders 16, 17. At any locality there may only be a Y-sounder 16 warning that an A on-off device has been triggered or a Z-sounder 17 warning that a B on-off device has been actuated.

There may be multiple sections S, C, A and B, in any order along the line. For instance, referring also to FIG. 2, the order from the control station measuring point 2 in conductor 1 may be an A section 18, a smoke detector C section 19, a B section 20, an alarm sounder section S with a Y alarm 21, an A section 22 with devices controlled by a combined C section 23, and a second alarm sounder section S with a Z alarm 24 adjacent a termination 25 across the cable conductors 1 and 1*a*. In general there will be many more of each, as aforesaid in any order along the line.

Figure 2:
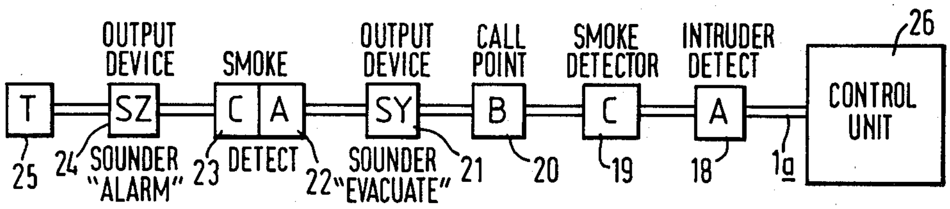
FIG. 2 shows a variation of the FIG. 1 alarm system, purely in block schematic form.

A control unit, referenced 26 in FIG. 2 contains the measuring point 2 (FIG. 1), an oscillator 27 with control inputs 28 for the positive wave polarities, and 29 for the negative polarity portions. There will be input signals on these only when a group 30 of voltage comparators give an alarm-denoting combination of outputs. The oscillator ac output, preferably square waves with the durations of the positive and negative portions independently switchable between two possible durations via the control inputs 28, 29, is fed to the cable 1 via a voltage-dropping series resistor 31 and the measuring point 2. The inputs of each of the group of comparators are also connected to measuring point 2 to sense the voltages developed thereat, from the positive and negative excitations of the network. The inputs fed to oscillator 27 are developed by logic means not shown in FIG. 1 but an example of which is described hereinafter from the combined outputs of comparators 30.

Referring to the sections C, one of which is seen in FIG. 1, the ac from oscillator 27 typically of 24 volts peak to peak passes through any normally closed contacts 3A, 3B intervening and is rectified by diodes 32, 33 to provide 18 volts dc between terminals 34, 35. To this end the diodes 32, 33 have opposite electrodes connected to conductor 1 and their second electrodes connected to each end of a chain of sensors 11, an intermediate point of which is connected to conductor 1*a*. Alternatively or additionally sensors or section C may be some of the on-off elements 8A of section A arranged to respond to heating by closing. The zener 7A in series is then connected across the line for one polarity of the exciting ac, rather as a sensor in U.S. Pat. No. 3,676,877 (referred to in the preamble hereto) connects a characteristic zener across a dc line voltage. The sensors of section C may be powered independently of the line ac but the described rectification is more economical in keeping with the inventive teaching to use the one line and signal.

Figure 3:
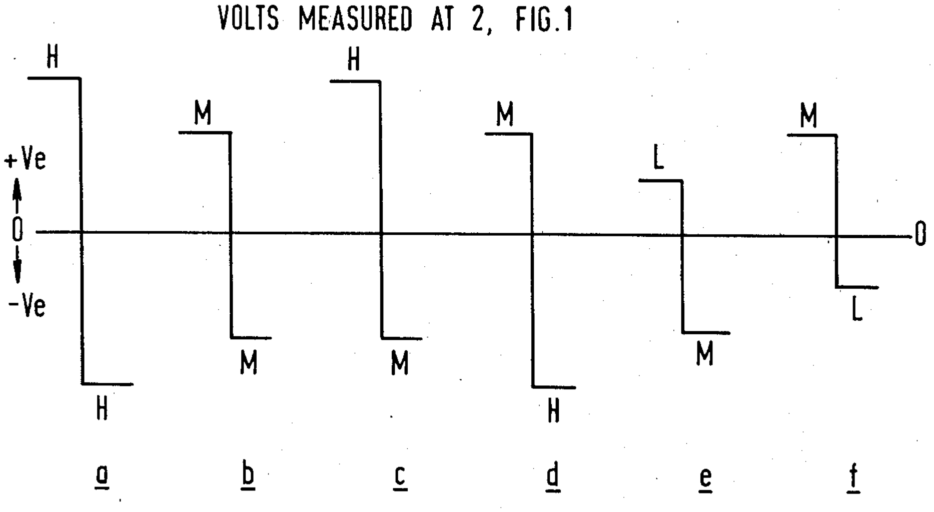
FIG. 3 shows the effects of various alarm conditions on the voltage measured from a reading alternating waveform.

Referring now to FIG. 3, waveform graphs a to f we will consider the individual significances of various responses by the ac voltage against time developed at measuring point 2, FIG. 1, in response to disturbances of the A or B on-off devices or the cable conductors themselves. In FIG. 3 a high voltage, typically 12 volts is termed H, a medium voltage, perhaps 10 volts, is illustrated M, and a low voltage (perhaps 3 volts) is referred to as L. We have to consider the positive and negative waveforms separately, in view of the diode polarities across the on-off contacts 3 and 8 (the polarities of diodes shunting contacts with energizing ac power is also considered in British Pat. No. 913,666 referred to above).

Graph a of FIG. 3 shows the peak amplitudes of the incoming drive wave from the oscillator 27 of FIG. 1 (we are not concerned with frequency or durations of the alternate peaks in this discussion, only their amplitudes). Both peaks are high (H). Graph b of FIG. 3 shows M amplitudes developed at measuring point 2 when all the contacts 3 and 8 are at their normal positions, not actuated. Volts are dropped in resistor 31 and the two M amplitudes correspond to the values of zeners 9 and 10 in cable terminating section T, with a small allowance for cable impedance. Thus if we find two M peaks, all contacts are normal.

Graph c of FIG. 3 shows a high positive peak and a normal negative peak. One or more series contacts 3A bridged by a negative current passing diode 5A has been opened and the negative driving peaks are controlled by zener 9 to reflect M amplitudes at point 2 while thereat the positive peaks reach H because they are blocked by opened contact 3A and diode 5A from reaching the termination zeners. Graph d of FIG. 3 shows the opposite situation to Graph c, a series contact 3B has opened and all contacts 3A remain closed as normal.

Graph e of FIG. 3 shows the wave amplitudes when a normally open contact 8B is closed, the negative peaks remaining at M corresponding to the terminating zeners but the positive peaks passing through the contact 8B and diode 6B to avalanche the zener 7A whose low value shunts the termination zener of section T, and the positive value L is experienced at measuring point 2. Graph f of FIG. 3 shows the opposite situation where a normally open contact 8A of an A section is closed.

Referring again to Graph a of FIG. 3 the two H values will also appear at 2 if the cable is broken, another alarm condition to be detected. No zener will be activated. This would also happen if both an A and a B series contact opened together.

The measuring voltage at 2 would go below L values for both polarities if the cable developed an effective short circuit, approaching zeroes depending on the assumedly small impedance of the intervening length of cable before the short-circuit.

The voltage comparators 30 develop combined outputs at any time depending on which of the ac waves 3*a* to 3*f* is detected.

We will assume the simple requirement only, that we be able to recognise a manual call-point section B alert as a Z alarm, and an automatically detected intruder or A alarm, fire alarm or cable fault to be manifested as a Y alarm, or both types of alarm together by both Y and Z alarms sounding. In practice, perhaps the fire alarm may well have to be treated differently, but the above criteria will serve for explanation of the invention.

Figure 4:
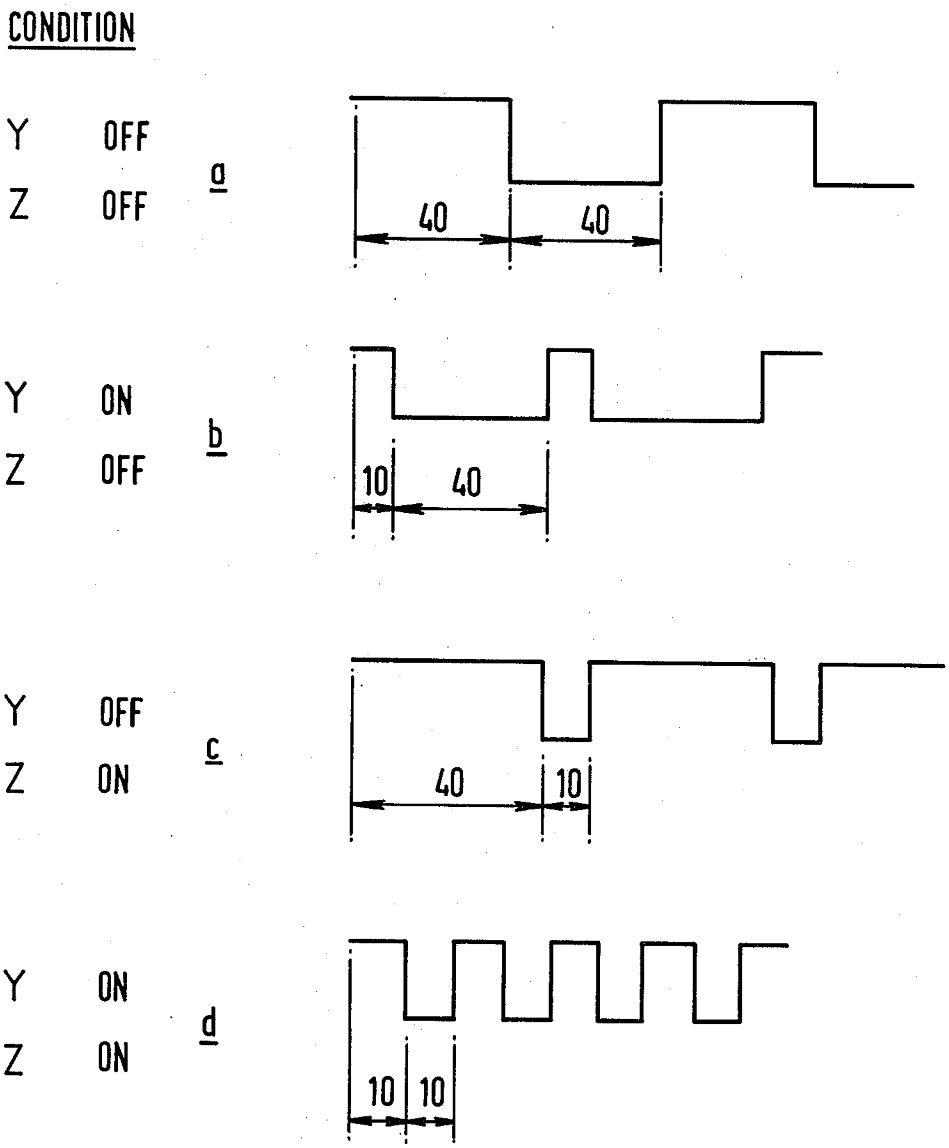
FIG. 4 shows possible automatic alterations in the reading waveform of FIG. 3, to provide selective excitations of two different alarm conditions.
Figure 5:
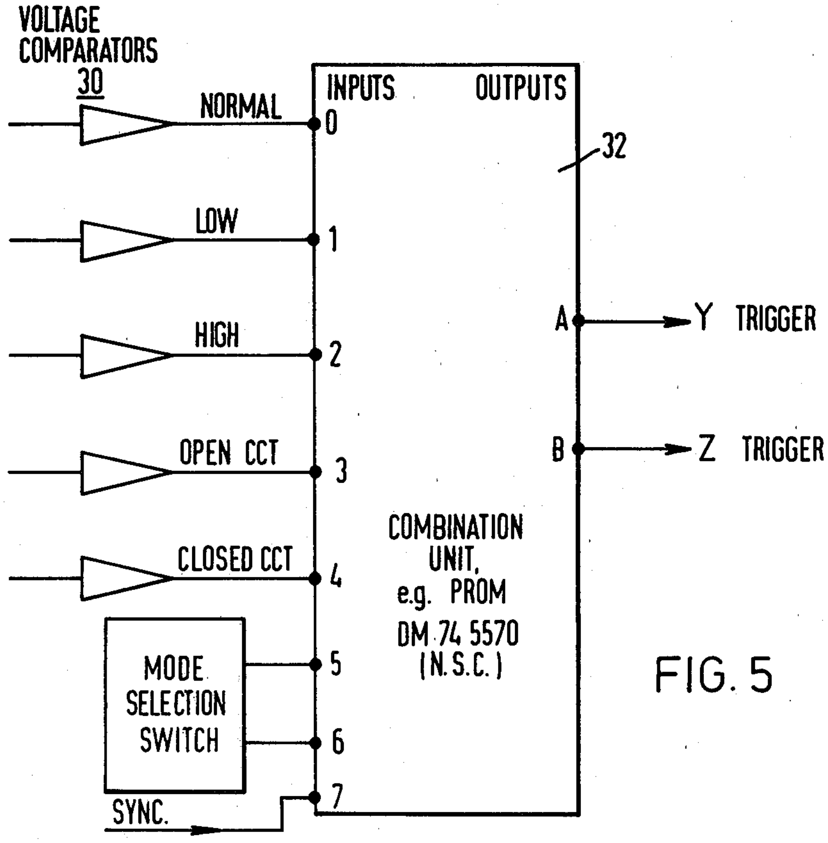
FIG. 5 shows diagrammatically an integrated circuit chip for using various voltage combinations to generate alternative triggering words.

Presently preferred is that the ac wave from oscillator 27 have long, 40 millisecond positive and negative peaks as in Graph a of FIG. 4 for neither alarm condition, that the positive peaks be shortened to 10 milliseconds for the Y alarm, as in Graphs 4*b* and 4*d*, and that the negative peaks be similarly shortened for the Z alerts, as shown by Graphs 4*c* and 4*d*. The changes in duration are assumed not to alter the power supply functions of the oscillations and yet be sufficiently marked to recognize. Amplitudes will preferably be unchanged, e.g. using limiters not shown. The Y and Z control signals will be fed to inputs 28 and 29 respectively of the oscillator, FIG. 1, and may be developed from the comparators 30 FIG. 1 by an integrated logic chip 32 shown diagrammatically in FIG. 5.

Figure 6:
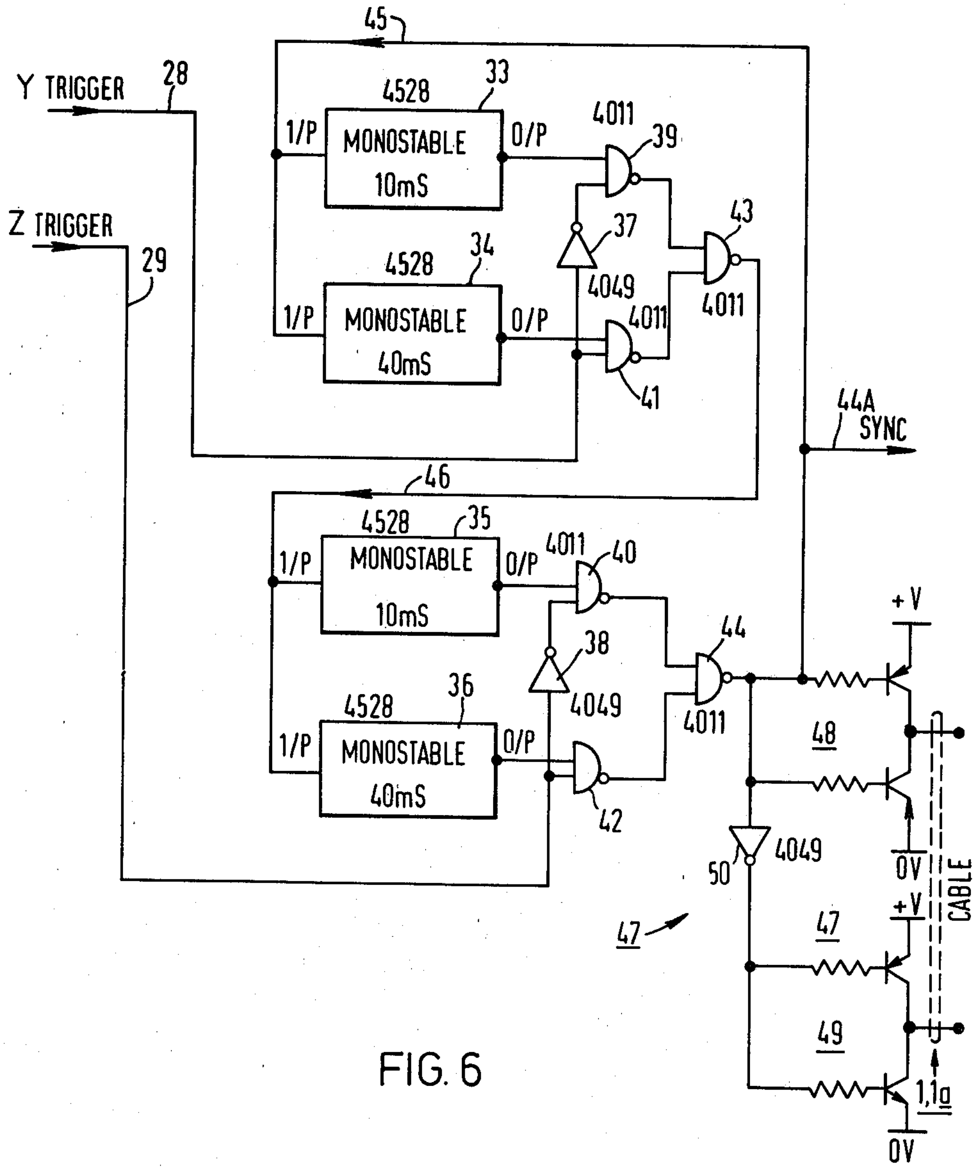
FIG. 6 is a circuit schematic of an oscillator generating waves of controllable polarity durations.

Circuit 32 may be a combination PROM unit type DM 745570 obtainable from the National Semiconductor Company, with inputs numbered 0–7 and outputs A and B for the Y and Z triggering 0's. High or one outputs from chip 32 are assumed normal in this embodiment, bringing about long 40 millisecond peaks. If normal, M levels are detected by the comparators, input 0 will be high, one or both L levels will be signalled to input 1 of chip 32, one but not both H levels will energize input 2, both H (cable open circuit) will be on input 4, and both zero will be on input 4 denoting a cable short-circuit. Inputs 5 and 6 are for mode selection, while input 7 receives the energizing square wave waveform or a derivative therefrom to synchronize or time the evaluation, so that high negative can be distinguished from high positive peaks. The comparators 30 are not further described, being very well known components. The Y and Z control of oscillator 27 will now be apparent from the circuit diagram of FIG. 6 showing a controlled multivibrator oscillator using two alternative monostables 33, 34, type 4528, of different relaxative times 10 and 40 mS for generating the positive polarities controlled by the Y input 28 and similar short and long relaxation monostables 35, 36 for generating alternative length negative wave portions. The 10 millisecond monostables 33, 35 will only be activated when alarm-indicating O-levels are on Y, Z, inputs 28 or 29.

The monostables are triggered by negative-going transients to give ones. Inverters 37, 38 cause any 0's on inputs 28, 29 to give 1's to NAND gates 39 and 40. 1's on inputs 28, 29 give 0's to 39 and 40 but 1's to NAND gates 41 and 42. Gates 39–42 determine whether the 1's from the short or long relaxation monostables 33–36 prevail, to cause negative-going pulse outputs from NAND gates 43, 44 at times appropriate to the desired polarity crossovers in the final wave. The NAND gates 43, 44 trigger the opposite monostables via connections 45, 46 and NAND gate 44 controls the output driver 47 feeding the cable 1, 1*a*. Thus the multivibrator formed by components 33–46 has positive and negative cycles independently controllable between the two values 40 and 10 milliseconds. Devices 37, 38 and 50 may be 4049 type. The gates may be type 4011. Output driver 47 may contain two complementary symmetry bipolar pairs 48, 49 as shown and an input inverter 50, to deliver any of the four alternative waves of Graphs 4*a–d*. These are evaluated by the monostables 12, 13 and D-registers 14, 15 of the sections S, FIG. 1 and illustrated more fully in FIG. 7. Gate 44 output 44A feeds SYNC to input 7, FIG. 5.

Figure 7:
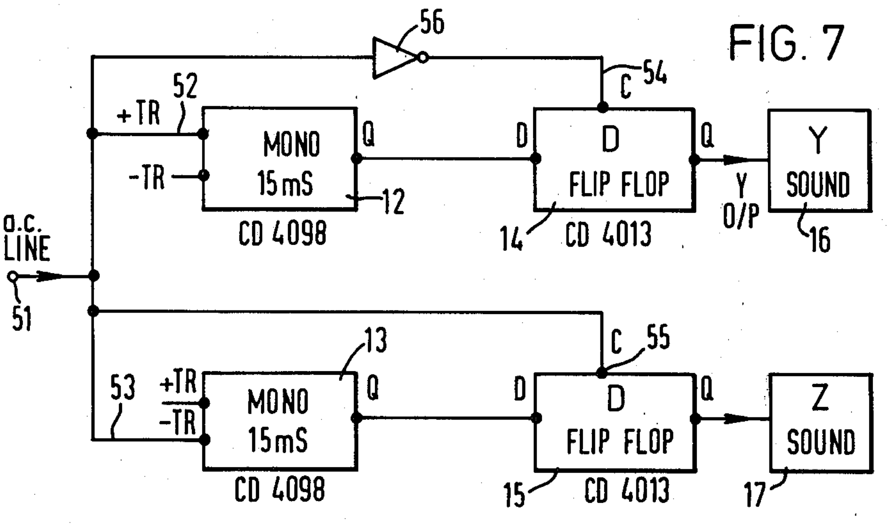
FIG. 7 is a block schematic diagram of a circuit to generate three different alarm output conditions in response to shortened positive and negative ac wave portions.

In FIG. 7, an input terminal 51 is connected to conductor 1 of FIG. 1 anywhere between the measuring point 2 and the termination section T at one or more localities where one or more alarms are to be sounded for the short duration positive and/or negative wave portions shown in FIG. 4. The terminal 51 is connected to the positive input 52 of the 15 ms monostable 12 and the negative input 53 of the 15 ms monostable 13, also to clock inputs 54, 55 of the D-type registers 14 and 15, the lead to input 54 containing an inverter 56. The outputs of registers 14, 15 are connected to the alarm sounders 16 and 17. Components 12–17 are also seen in FIG. 1.

The positive going edges of the waves of FIG. 4 from oscillator 27, FIG. 1 will trigger monostable 12 into delivering a 1 output for 15 milliseconds and this will activate alarm sounder 16 if register 14 is receiving a high signal at its C input 54. If positive pulses last less than 15 ms then, due to inverter 56, a 1 will now be present at input 54 and a Y alarm will sound. If positive pulses exceed 15 ms, e.g. have 40 ms duration (denoting Y off, see FIG. 4), the consequent low at input 54 will cause no Y alarm output to actuate sounder 16.

Analogous action by 15 ms monostable 13 and register 15 causes Z soundings only when negative going pulses signifying "Z on" are picked up from conductor 1*a*. The duration of the monostables should not exceed the long pulse length or exceed three times the short pulse length in this embodiment.

The use of the ac energization of the line proposed in the above arrangement enables installation of twice as many shunt alarm paths since positive and negative cycles of the ac are distinguished. Powering by ac also enables use of series alarm paths because an open-circuit cable and an open on-off contact 3 (FIG. 1) are easily distinguishable by reading the two polarities (Graphs 3*a, c, d*). Furthermore, ac energization facilitates alternative alarm raising down the same cable, whether by polarity durations or otherwise.

The use of our diodes 6 in series with the zeners in the parallel paths is not absolutely necessary, even with ac energization, since 3*e* and *f* could be recognised by an 1 for one polarity and a zero for the other, if the diodes were absent. That zero, when present, prevents the parallel paths with the other polarity of zener being read, which may be a disadvantage in some circumstaces. Often, however, once an alarm is raised, ability to read further alarm conditions is not of interest.

D-registers such as those shown at 14, 15 have a clocked or strobe input C, a data input D and a data input Q. Whenever an appropriate input, such as a 1 or high level signifying a strobe signal, is present at C, the data input then at D is passed to Q and stays stored at Q. Such devices are sometimes called D-type flip-flops or C-D flip-flops but it should be remembered that the output Q does not change unless the data input has changed since the last strobe at C.

Other ways of responding to polarity duration changes will readily occur to the skilled man. In alternative apparatus the duty cycle rather than mere durations as in FIG. 4 may be altered, the frequency then remaining constant.

What is claimed is:

1. In a security system including a station at a locality to be secured, a control station for registering security sensing information communicated thereto by the locality station and for communicating command signals to the locality station, and a transmission cable for the communications in both directions between the control station and the locality station, equipment at the locality station comprising:

means to receive an ac signal from the transmission cable, the ac signal having a waveform comprising first and second portions, the first portions being generally towards one polarity in the ac signal and the second portions being generally towards the opposite polarity in the ac signal, alarm commands being communicated from the control station to the locality station as variations in the durations of the first and second portions of the ac signal;

first and second independently operable sensing means to provide respective outputs designative of security states;

first non-linear means to provide a loading only to said first portions of the waveform of the ac signal which loading is dependent selectively on the output of the first sensing means;

second non-linear means to provide a loading only to the second portions of the waveform of the ac signal, which loading is dependent selectively on the output of the second sensing means; and means arranged to receive the ac signal and to respond to variations in the durations of said first and said second portions of said ac waveform to identify the alarm commands.

2. Equipment according to claim 1 wherein at least one of the first and second nonlinear means includes a first circuit connected to the cable, the first circuit comprising:

a normally closed contact, the opening of which is denotive of an alarm state, a nonlinear device in shunt with the normally closed contact, and a cable termination voltage reference device in series with the cable and the circuit.

3. Equipment according to claim 2 wherein:

the contact is installed at a position at the locality so as to be automatically actuated by an intruder.

4. Equipment according to claim 1 wherein at least one of the first and second nonlinear means includes a second circuit which comprises:

a normally open contact, the closing of which is denotive of an alarm state, and a voltage reference device in series with said normally open contact, wherein said second circuit is in shunt across the cable.

5. Equipment according to claim 4 wherein: the contact is automatically actuable by an intruder at the locality.

6. Equipment according to claim 1 comprising:

further alarm sensing equipment, and an auxiliary power supply arranged to power the further alarm sensing equipment, wherein said auxiliary power supply is in shunt across the cable, for being energized by said ac signal.

7. Equipment according to claim 1 comprising:

first and second equal value voltage reference devices connected opposingly across the cable as a cable termination at the location:

said equal value exceeding the values of any other voltage references devices shunting the cable at the locality equipment.

8. Equipment according to claim 1 comprising:

alarm command responsive means connected across the cable input to the location equipment, this means including, a monostable having an input coupled to the cable and an output:

a data register having a clock input coupled to the cable, a data input coupled to the output of the monostable, and an output; and an alarm command manifesting device coupled to the data register output.

9. A security system control station equipment, comprising:

means to apply an ac signal to a transmission point for communication of the ac signal to a locality equipment, the waveform of the ac signal comprising first and second portions of respective durations;

first and second duration controlling means arranged to respond to individual loadings offered by the locality equipment, in response to respective security conditions, respectively to the first portion and to the second portion of the waveform of the ac signal; wherein said duration controlling means is adapted to affect the durations of respectively the first and the second portions of the ac signals, thus impressing command signals thereon for their communication over a cable to the locality equipment from the transmission point.

10. Equipment according to claim 9 wherein the duration controlling means comprises:

a square wave oscillator having alternative durations of the positive polarity wave portions and having alternative durations of the negative polarity wave portions, wherein selection inputs of the oscillator are arranged so as independently to select the alternative wave portion durations at the two polarities.

11. Equipment according to claim 10 having means to generate said selection inputs, comprising:

a series resistance at the connection to said cable a logic circuit coupled to receive the voltage developed by said series resistance:

a set of voltage comparators and voltage references in the logic circuit coupled to give output digits depending on said developed voltage:

means in the logic circuit to route the output digits to serve as said selection inputs for appropriate control of said duration controlling means.

12. A security system comprising a control station equipment according to claim 11, said cable extending to a locality station, and equipment at the locality station comprising:

a set of on-off contacts associated with non-linear means and voltage reference devices whereby the conditions of said contacts give rise to a plurality of possible voltages at each of two polarities developed across said series resistance at the control station equipment: and alarm command responsive means capable of distinguishing between plural possible durations at each polarity in the incoming ac wave from the control station, as distinct alarm commands.

13. A security system according to claim 12, wherein said alarm command responsive means comprises:

a monstable having an input coupled to the cable and an output:

a data register having a clock input coupled to the cable, a data input coupled to the output of the monostable and an output; and an alarm command manifesting device coupled to the register output.

14. A security system according to claim 10 wherein the square wave oscillator comprises:

a first plurality of triggered monostables with different relaxation times and with their inputs connected in parallel:

a first selection circuit having separate data inputs coupled to individual outputs of the monostables, a control input and a single output: and a second plurality of triggered monostables with different relaxation times and with their inputs connected in parallel to the single output of the first selection circuit:

a second selection circuit having separate inputs coupled to individual outputs of the monostables of said second plurality a control input, and a single output coupled to the commoned inputs of all the monostables of the first plurality:

the first and second selective circuits being each adapted to connect a selected one of its separate inputs to its single output, and the input selected depending on a control signal applied to its control input; the control inputs thus serving as said selection inputs of said square wave oscillator; and the square waves being supplied by alternate triggering of a selected monostable from either one of the plurality on the relaxation of a selected monostable from the other plurality.

15. A security system including equipment at a station to be secured, a control station having equipment for registering security sensing information communicated thereto by the locality station and for communicating command signals to the locality station, a transmission cable for the communications in both directions between the control station and the locality station, and means to apply an ac signal to the transmission cable, the equipment at the locality station comprising:

means to receive the signal from the transmission cable, the ac signal having a waveform comprising first and second portions, the first portions being generally towards one polarity in the ac signal and the second portions being generally towards the opposite polarity in the ac signal, alarm commands being communicated from the control station to the locality station as variations in the durations of the first and second portions of the ac signal;

first and second independently operable sensing means to provide respective outputs designative of security states;

first non-linear means to provide a loading only to said first portions of the waveform of the ac signal which loading means is dependent selectively on the output of the first sensing means; and second non-linear means to provide a loading only to the second portions of the waveform of the ac signal, which loading is dependent selectively on the output of the second sensing means; and means arranged to receive the ac signal and to respond to different alarm commands communicated to the location equipment by variations in the durations of, respectively, said first and said second portions of said ac waveform to identify the alarm commands;

and the equipment at the control station comprising means for varying the duration of the first or second portions responsive to the loading to the first or second portions of the ac waveform.

16. A security system comprising control station equipment, a cable and locality station equipment interconnected to the control station equipment by the cable, wherein the control signal equipment comprises:

means to apply an ac signal to the cable for communication of the ac signal to the locality station equipment, the waveform of the ac signal comprising first and second portions of respective durations, and first and second duration control means arranged to respond to individual loadings offered by the locality station equipment, in response to respective security conditions, respectively to the first portions and to the second portions of the waveform of the ac signal, the duration control means being adapted to affect the durations of respectively the first and the second portions of the ac signals, thus impressing command signals thereon for their communication over the cable to the locality station equipment from the control station equipment;

and wherein the locality station equipment comprises alarm command responsive means capable of distinguishing between a plurality of possible durations at each polarity in the incoming ac waveform from the control station equipment as distinct alarm commands, said alarm command responsive means comprising a monostable having an input coupled to the cable and an output, a data register having a clock input coupled to the cable, a data input coupled to the output of the monostable and an output and an alarm command manifesting device coupled to the register output.

17. A security system comprising control station equipment, a cable and locality station equipment interconnected to the control station equipment by the cable, wherein the control signal equipment comprises:

means to apply an ac signal to the cable for communication of the ac signal to the locality station equipment, the waveform of the ac signal comprising first and second portions of respective durations, and first and second duration control means arranged to respond to individual loadings offered by the locality station equipment, in response to respective security conditions, respectively to the first portions and to the second portions of the waveform of the ac signal, the duration control means being adapted to affect the durations of respectively the first and the second portions of the ac signals, thus impressing command signals thereon for their communication over the cable to the locality station equipment from the control station equipment;

wherein the locality station equipment comprises alarm command responsive means capable of distinguishing between a plurality of possible durations at each polarity in the incoming ac waveform from the control station equipment as distinct alarm commands, and wherein the duration controlling means comprises a square wave oscillator having alternative durations of the positive polarity wave portions and having alternative durations of the negative polarity wave portions, selection inputs arranged so as independently to select the alternative wave portion durations at the two polarities, a first plurality of triggered monostables with different relaxation times and with their inputs connected in parallel, a first selection circuit having separate data inputs coupled to individual outputs of the monostables, a control input and a single output, and a second plurality of triggered monostables with different relaxation times and with their inputs connected in parallel to the single output of the first selection circuit, a second selection circuit having separate inputs coupled to individual outputs of the monostables of said second plurality, a control input, and a single output coupled to the commoned inputs of all the monostables of the first plurality, the first and second selective circuits being each adapted to connect a selected one of its separate inputs to its single output, and the input selected depending on a control signal applied to its control input, the control inputs thus serving as said selection inputs of said square wave oscillator, and the square waves being supplied by alternate triggering of a selected monostable from either one of the plurality on the relaxation of a selected monostable from the other plurality.

18. In a security system including a station at a locality to be secured, a control station for registering security sensing information communicated thereto by the locality station and for communicating command signals to the locality station, and a transmission cable for the communications in both directions between the control station and the locality station equipment at the locality station arranged so as in use to be energized by an ac power supply signal applied to the cable by the control station, means to receive the ac signal from the transmission cable the ac signal having a waveform comprising first and second portions, the first portions being generally towards one polarity in the ac signal and the second portions being generally towards the opposite polarity in the ac signal, alarm commands being communicated from the control station to the locality station as variations in the durations of the first and second portions of the ac signal, the locality station equipment comprising:

first and second sensing means to provide respective outputs designative of security station;

first non-linear means to provide a loading only to said first portions of the waveform of the ac signal which loading means is dependent selectively on the output of the first sensing means;

second non-linear means to provide a loading only to the second portions of the waveform of the ac signal, which loading is dependent selectively on the output of the second sensing means; and means arranged to receive the ac signal and to respond to variations in the durations of said first or said second portions of said ac waveform to identify the alarm commands.

19. A security system control station equipment, comprising:

means to apply an ac power supply waveform to a transmission point for communication of the ac signal to a locality equipment arranged to be energized by the ac power supply waveform, the ac power supply waveform comprising first and second portions of respective durations;

first and second duration controlling means arranged to respond to individual loadings offered by the locality station equipment, in response to respective security conditions, respectively to the first portion and to the second portion of the ac power supply waveform wherein said duration controlling means is adapted to affect the durations of respectively the first and the second portions of the ac power supply waveform, thus impressing command signals thereon for their communication over a cable to the locality equipment from the transmission point.

* * * * *